Patented Mar. 14, 1939

2,150,785

UNITED STATES PATENT OFFICE 2,150,785

WELDING ROD

Robert M. Rooke, Jersey City, N. J., and Frederick C. Saacke, New York, N. Y., assignors to Air Reduction Company, Incorporated, New York, N. Y., a corporation of New York No Drawing. Application October 27, 1937, Serial No. 171,340

3 Claims. (Cl. 219—8)

The invention relates to ferrous welding rods applicable to the oxyacetylene welding process.

The welding rods of this invention are low carbon steel rods containing functional amounts of nickel, manganese, and silicon without any significant amounts of alloying constituents such as chromium, vanadium, copper or molybdenum, which would materially change the properties of the welding rod.

Gas welding rods of nickel steel composition, as distinguished from nickel-vanadium or chrome-nickel compositions, have been known for many years. As far as we are aware, the nickel content of the nickel steel welding rods has usually been relatively high, that is to say above about 3% and commonly of the order of 3.50%. It is recognized that many steel welding rods with nickel contents less than 3% have been used in the past, but all such rods have actually been alloyed with other elements. The higher nickel contents seem to have been considered necessary for the production of equally strong welds on all grades of base metal.

In commercial practice, in order to standardize on one welding rod for various grades of base metal, it is necessary that such a welding rod give satisfactory welds on base metals whose tensile strength may range from a minimum of 45,000 lb./sq. in. to a maximum of 75,000 lb./sq. in., and since a satisfactory welded joint is one in which the weld metal is at least as strong as the base metal, high tensile nickel steel welding rods previous to this invention were designed so that the deposited metal tensile strengths would be as high as possible and preferably a little in excess of 75,000 lb./sq. in. Thus, nickel steel welding rods capable of attaining a deposited metal tensile strength of 75,000 lb./sq. in. or thereabouts have been used not only on medium carbon steel base metals of approximately 75,000 lb./sq. in. tensile strength but also on weaker materials down to the low carbon steels of only 48,000 lb./sq. in. tensile strength.

In addition to the high tensile strength of the resulting welds, the use of such nickel steel rods has been favored because of their superior "weldability" as compared with a low carbon or mild steel welding rod. Due to the alloying additions in the welding rod, the melting point and thermal conductivities of the steel are lowered below that of the carbon steel base metals on which they are ordinarily applied, which combination of properties simplifies the welding procedure for the welding operator. On the other hand, in the important property of ductility, the single layer gas welds obtained with ordinary nickel steel rods are deficient.

As carbon and other alloying elements are added in commercial use to iron, the tensile strength of the cast steel is increased at the expense of the ductility. So long as a high order of cast steel tensile strengths was considered necessary in a welding rod because it may be used on 75,000 as well as 45,000 lb./sq. in. tensile strength base metals, the ductility of the cast weld metal was unavoidably low. With the realization that the tensile strengths of nickel steel weld metals are unusually responsive to the carbon content of the base metal, it has now been found practicable to lower the alloy content of the nickel steel welding rod to the point where a weld on low carbon steel base metal will show a weld metal tensile strength only slightly in excess of the base metal tensile strength, thereby increasing the ductility of the weld metal by the reduction in alloying content, and to rely on the alloying effect of the melted base metal to keep the weld metal tensile strengths on higher carbon base metals still in excess of the base metal tensile strength.

In other words, substantially only enough nickel need be added to the welding rod to make the weld metal tensile strength just exceed the base metal tensile strength, thereby lowering the ductility of the weld metal as little as possible.

The object of this invention is, therefore, to secure high weld metal ductility with ample tensile strength while at the same time preserving superior weldability such as that of known nickel steel welding rods. We have found that these results can be achieved by materially lowering the customary nickel content and keeping the carbon and manganese within certain limits. The successful performance of the new rods is due to the sensitiveness of their deposited molten metal to the carbon or the carbon and manganese contents of the base metal, which is also melted at least superficially in the welding process. For example, we find it possible with one and the same composition of rod to obtain a weld metal tensile strength of say 50,000 lb./sq. in. on 45,000 lb./sq. in. base material and 80,000 lb./sq. in. on 75,000 lb./sq. in. material. Naturally, the tensile strengths of the weld and of the base metal need not be as close as this. The example illustrates that in the rods of this invention dependence is not placed, as before, on a composition which will give a high weld metal tensile strength regardless of the strength of the base metal used, but rather on the property of a composition melted and cast under the conditions of gas welding and modified by the alloying elements of the base metal to adjust its weld strength sufficiently and adequately above the varying tensile strengths of base metals usually encountered. With this property the rods give welds remarkable in ductility under the free bend test. These features are accompanied by unimpaired weldability and high weld impact strength.

Rods of the present invention fall within the following compositions:

|  | Per cent |
|---|---|
| Carbon | 0.05–0.25 |
| Manganese | 0.25–0.65 |
| Silicon | 0.05–0.30 |
| Nickel | 0.75–1.90 |

Balance substantially all iron except for usual impurities and such additions as will not essentially alter the nature of the rods. As regards phosphorus and sulphur, it is advisable to keep each of these elements below 0.05%, or more desirably below a maximum of 0.030–0.035%.

Since the carbon and manganese contents along with the content of nickel are important for the realization of the advanatages, the combined amounts of these alloying constituents must be closely limited so that the sum of carbon and manganese is not over 0.80%, more especially not over 0.70%.

A rod which as far as we have been able to ascertain affords the practical advantage of the invention for general uses may be manufactured by ordinary procedure to the following analysis:

|  | Per cent |
|---|---|
| Carbon | 0.10–0.20 |
| Manganese | 0.25–0.45 |
| Phosphorus, maximum | 0.03 |
| Sulphur, maximum | 0.03 |
| Silicon | 0.15–0.25 |
| Nickel | 1.25–1.75 |
| Chromium, maximum | 0.15 |

In this specification the maximum for chromium is to be regarded as a permissible maximum for an element which if present is virtually an impurity. The presence of chromium is not desired, but it often occurs in scrap material from which steel products are made, and up to about 0.15% it does not materially affect the properties of these rods.

In general, the most satisfactory welding rods of the invention are expressed by ranges and limits as follows:

|  | Per cent |
|---|---|
| Carbon | 0.10–0.20 |
| Manganese | 0.35–0.55 |
| Phosphorus, maximum | 0.030 |
| Sulphur, maximum | 0.035 |
| Silicon | 0.15–0.25 |
| Nickel | 1.10–1.40 |
| Sum of carbon and manganese not over | 0.70 |

We are aware of nickel-vanadium rods in which the alloying constituents are relatively low, but the fact is that a nickel-vanadium rod behaves quite differently from a nickel steel rod. To mention but one difference, a nickel-vanadium rod weld must be heat treated to develop much ductility, whereas with the present rod high weld ductility is obtained in a single weld pass and without the necessity for subsequent heat treatment. If multi-layer welding is practiced with a rod of the invention, ductility and impact strength can be even more greatly increased.

We claim:

1. A gas welding rod of nickel steel composition containing carbon 0.05% to 0.25%, manganese 0.25% to 0.65%, silicon 0.05% to 0.30%, nickel 0.75% to 1.90%, balance substantially all iron, the sum of carbon and manganese not over 0.80%.

2. A gas welding rod of nickel steel composition containing: carbon 0.10% to 0.20%, manganese 0.35% to 0.55%, silicon 0.05% to 0.30%, nickel 1.10% to 1.40%, balance substantially all iron.

3. A gas welding rod of nickel steel composition containing: carbon 0.10% to 0.20%, manganese 0.35% to 0.55%, silicon 0.05% to 0.30%, nickel 1.10% to 1.40%, balance substantially all iron, the sum of carbon and manganese not exceeding 0.70%.

ROBERT M. ROOKE.
FREDERICK C. SAACKE.